United States Patent Office 2,821,483
Patented Jan. 28, 1958

2,821,483

PROCESSES FOR THE DISINFESTATION OF VEGETABLE PRODUCTS BY MEANS OF TOXIC GASES

Felice Bonomi, Milan, Italy, assignor of one-half to Ernesto Buehler, Milan, Italy No Drawing. Application October 10, 1955
Serial No. 539,697

Claims priority, application Italy October 20, 1954

5 Claims. (Cl. 99—225)

The need for disinfesting agricultural products arises not only from the necessity of avoiding serious deterioration of the products by the infestation from insects which in the long run causes spoilage of the products but also, and above all, from the necessity of avoiding indirect damage, due to the devaluation on the market of an infested product even though the product is not yet spoiled.

This need is particularly felt in the field of vegetables collected, stored, or even packaged for selling.

In this field the methods now in use vary from the employment of physical means, i. e., convective and conductive heat, infrared radiation, ultraviolet radiation, hertzian radiation of high frequency, exclusion of air, and so on, to chemical means which include the employment of fumigants such as hydrogen cyanide, chloropicrin, methyl bromide, ethylene oxide, and the like. Research is still going on to find the most rational and economical solution to the problem of destroying completely all of the insects and mites infesting the products.

A problem that is encountered is one of avoiding any alteration of properties of the agricultural products treated, which would stimulate sense perception as well as avoiding the utilization of chemical substances toxic to man.

Attempts have been made to disinfest agricultural products through the utilization of a technical vacuum to integrate the chemical means. However, these attempts have not been successful in solving the problem in its entirety. In fact, if the insects or mites have a vital activity and, therefore, respiration in relation to their biological cycle, their vulnerability under the action of a toxic substance is very much reduced. Thus the vacuum has proved to be only partially effective.

It is known, in fact, that the vital activity of the arthropoda infesting the products depends not only upon their biological cycle, but, above all, upon the ambient conditions under which their life develops. It is known, for instance, that these insects are in full physiological activity with active respiration at temperatures above 20° C. At temperatures of about 15° C. their vital activity is considerably slowed down and, thus, their respiratory activity is diminished. Below 10° C. their vital activity may be lethargic and even remain suspended. Under such conditions, a disinfestation by means of fumigants of products infested by such insects would not be feasible.

The present invention relates to a process for disinfesting agricultural products which does not take into consideration conventional methods of disinfesting based on external physical factors, e. g., careful diffusion of the gases.

The process of this invention is characterized in that an artificial atmosphere is employed as a carrier for toxic gases. This artificial atmosphere enhances the physiological activity of the insects to be destroyed, which increases their capacity for absorbing gas. The concentration of the gas is kept within the limits of non-toxicity to the vegetable.

As a carrier atmosphere for the toxic gas, an artificial atmosphere rich with oxygen may be employed which has the property of enhancing considerably physiological activity of insects and which may be obtained easily at ordinary pressure in easily built plants at comparatively low cost.

It has been found that an increase in the concentration of oxygen in the atmosphere surrounding the products to be disinfested produces a higher stimulating action upon the physiological activity of some Arthropoda, than does the temperature factor.

It has been found, for example, that an increase in the amount of oxygen present in the atmosphere surrounding the products to be disinfested to a concentration of about 50–70% is followed by an intensification, although temporary, of all the physiological activities of some aerobic insects or mites to be destroyed, with a proportional enhancement of the respiratory activity. Hence, there takes place an absorption of fumigants by the insect which in time is a function of the increase of the concentration of oxygen present in the gaseous mixture artificially prepared.

However, an atmosphere rich in oxygen is not always suitable for carrying out the process according to the present invention. It is evident that owing to the great variety of species of infesting insects, their complex biological cycle taking place through the various seasons, and the great variety of infested products, it is not possible to disinfest rationally and effectively by following the fundamental principle as set forth hereinbefore without using an activating artificial carrier atmosphere developed in view of both the species and biological cycle of the insects to be destroyed and in view of the products to be disinfested as well.

It is known that on infested products there may be found eggs, larvae, chrysalides or adult insects. Experience has shown that in these various stages of the biological cycle of the insect, there varies not only the insect's sensitivity to the toxic action, but also the possibility of increasing that sensitivity, that is, of enhancing their respiratory activity and consequent capacity to absorb the toxic substance. The increase in sensitivity depends on the composition of the artificial carrier atmosphere, which has to be investigated in each specific case, with respect to the character of the gaseous constituents as well as with respect to their concentration. Moreover, with respect to the very great variety of vegetable products treated, e. g., fruits, kitchen vegetables, flowers, etc., the artificial atmosphere used as a carrier should be such as not to favor a phytotoxic action of the fumigant used.

Practice has shown that an atmosphere rich with oxygen is very well suited to enhance the physiological activity of perfect insects while, e. g., for the disinfestation from eggs and atmosphere rich with nitrogen is better suited.

Whatever the artificial atmosphere may be, it is evident that considerable benefit is provided by the process forming the subject matter of the present invention. It is possible to destroy completely in a short period of time insects and mites infesting vegetable products with small amounts of fumigants. By enchancing the respiratory activity of the Arthropoda there is absorbed in a unit of time by said Arthropoda, amounts of toxic substances sufficient to cause their death. Another factor that may be determining, in view of the preconceived purpose of compelling the insects to keep their respiratory organs open, is the relative moisture content of the medium enveloping the products to be disinfested. Therefore, according to one object of the invention, the relative moisture content of the medium, if need be, may be increased to the maximum value, i. e., 90–95%, permitted by the necessity of maintaining unaltered the features of taste and smell of the products treated.

The relative moisture content is kept constant during the entire operation, as well as the composition of the artificial atmosphere.

It should be understood that in order to maintain the composition of the artificial atmosphere constant it is necessary to remove from the enclosed medium, even with any of the methods already proposed, the carbon dioxide that is being produced by the respiration of the vegetable. It has been found advisable in practice to carry out this aspect of the invention regularly so that the amount of carbon dioxide present in the enclosed medium is never higher than 5% of the total volume.

To illustrate the principles hereinbefore set forth there are hereinafter described examples which are typical for the different types of artificial atmosphere that may be employed in accordance with the invention.

Example 1

Carnations infested by *Tortrix pronubana* in the state of a larva or of a chrysalis were enclosed in an artificial carrier atmosphere considerably rich with oxygen (55% oxygen, 45% nitrogen). Not only is there a total mortality of the infesting insect, but, by the stimulating effect of the oxygen-rich atmosphere the flower did not undergo a dejecting action in its cells due to the toxic substance employed. After treatment, it had a quite natural behaviour. In some cases it even had an improved behaviour regarding the opening of its petals and their deterioration as compared to a non-treated flower.

Example 2

For the disinfestation of products infested by eggs of insects, e. g., red spiders, or my cochineals, *Quadraspidictus periciosus*, such as fruits intended for long preservation, i. e., apples and pears, research has given evidence that the most suitable artificial carrier atmosphere for enhancing the activity of the insect to be destroyed as well as for the preservability of the products to be treated is constituted by a mixture of nitrogen and oxygen having the following composition: 90–95% nitrogen and 10–5% oxygen.

The action of the artificial atmosphere may be integrated by creating, for example, inside the perfectly closed room wherein the treatment is carried out, the conditions of temperature which are the ideal ones for the vital activity of the Arthropoda to be destroyed. The temperatures, investigated for every vegetable species, for every Arthropoda species, and with respect to the composition of the atmosphere, may be obtained and kept constant, e. g., by means of special electric thermoconvectors, the operation of which is adjusted by thermostatic equipment.

It is possible to employ means to homogenize the atmosphere inside the room in which the treatment is carried out and to permit the atmosphere to cover every area of the mass of vegetable products collected therein. These means may constitute, e. g., fans adapted to develop strong and rational ventilation inside the room, as well as means adapted to evacuate quickly from the cell the gaseous mixture used for the treatment of disinfestation and to replace it with washing air so as to free the products from any residue of the toxic substance used. Such means may include centrifugal aspirators or the like in combination with conduits for feeding fresh atmosphere air into said room.

As is obvious from the foregoing, the process according to the invention is carried out in practice by arranging the vegetables to be disinfested in a tightly closed cell, wagon, container, or hold, with all doors and other apertures provided with adequate gaskets to render the enclosure gas tight. Then if needed the surrounding temperature is brought to the desired degree by actuating the thermoconvectors. The relative moisture content inside of the enclosure is brought up to the highest admissible value, i. e., 90–95%, by means of a humidifying atmosphere. After the desired degree of temperaure and humidity is reached, adequate artificial atmosphere is introduced. Subsequent to the envelopment of vegetables by an artificial atmosphere, a fumigant of suitable concentration is introduced. The type of dosage chosen is as specifically studied for the various treatments. On terminating this operation, the fans are actuated to homogenize the atmosphere.

The time of exposure may vary within very wide limits, by varying inversely the concentration of the toxic substance used. After the exposure time has lapsed, the cell, wagon, or container is actuated by means of centrifugal aspirators which remove the gaseous mixture employed and at the same time provide a thorough wash with atmospheric air.

The process according to the present invention excludes the necessity of technical vacuum and, therefore, a special metal or concrete construction, which is capable of resisting the stresses due to vacuum because the process of the present invention is operated at atmospheric pressure.

The process of the present invention may be carried out in fixed plants, in railway cars, in containers, or in holds even during transportation. This eliminates useless and time consuming handling of the goods.

Having thus described my invention what I claim as new and desire to protect with Letters Patent is:

1. A process for disinfesting vegetable products which comprises enveloping said products with an artificial atmosphere consisting essentially of oxygen and nitrogen in which an atmosphere of from 50–70% oxygen is applied to insect infested products and an atmosphere of from 90–95% nitrogen is applied to larvae infested products for a period of time sufficient to enhance the physiological activity of the insects in one stage of their development and thereafter introducing toxic gases into said atmosphere in a concentration toxic to said insects but non-toxic to said products.

2. The process of claim 1 wherein the oxygen is present in said artificial gaseous atmosphere in an amount of 55%.

3. The process of claim 1 wherein the relative moisture content of the artificial gaseous atmosphere is from 90–95%.

4. The process of claim 1 wherein the temperature of the gases enveloping the product is maintained at a degree which will allow the most intense vital activity of the Arthropoda.

5. The process of claim 1 which includes removing continuously from said gaseous atmosphere carbon dioxide produced by the respiration of said products to maintain a carbon dioxide content therein of not more than 5%.

References Cited in the file of this patent

UNITED STATES PATENTS 1,140,717    Rutter _____ May 25, 1915

OTHER REFERENCES

"Organic Insecticides," Metcalf, pp. 74 and 89–90.